United States Patent
Pyörre et al.

(10) Patent No.: US 10,081,410 B2
(45) Date of Patent: Sep. 25, 2018

(54) SENSOR DEVICE FOR PROVIDING MARINE VESSEL DATA

(71) Applicant: Eniram OY, Helsinki (FI)

(72) Inventors: Jussi Pyörre, Ojakkala (FI); Pyry Åvist, Es (FI)

(73) Assignee: ENIRAM OY, Helsinki (FI)

( * ) Notice: Subject to any disclaimer, the term of this patent is extended or adjusted under 35 U.S.C. 154(b) by 0 days.

(21) Appl. No.: 15/509,811

(22) PCT Filed: Sep. 8, 2015

(86) PCT No.: PCT/FI2015/050586
§ 371 (c)(1),
(2) Date: Mar. 8, 2017

(87) PCT Pub. No.: WO2016/038249
PCT Pub. Date: Mar. 17, 2016

(65) Prior Publication Data
US 2017/0247086 A1    Aug. 31, 2017

(30) Foreign Application Priority Data
Sep. 8, 2014   (EP) .................... 14183932

(51) Int. Cl.
*G01H 1/00*     (2006.01)
*G01P 3/00*     (2006.01)
(Continued)

(52) U.S. Cl.
CPC ............ *B63B 9/001* (2013.01); *G01C 9/00* (2013.01); *G01C 21/203* (2013.01); *G01H 1/00* (2013.01); *G01P 3/00* (2013.01); *G07C 5/008* (2013.01)

(58) Field of Classification Search
None
See application file for complete search history.

(56) References Cited

U.S. PATENT DOCUMENTS

| 6,856,529 B1 | 2/2005 | Song |
|---|---|---|
| 7,031,873 B2 | 4/2006 | Song |
| | (Continued) | |

FOREIGN PATENT DOCUMENTS

| CN | 101842663 A | 9/2010 |
|---|---|---|
| CN | 102282472 A | 12/2011 |
| | (Continued) | |

OTHER PUBLICATIONS

International Search Report (PCT/ISA/210) dated Dec. 11, 2015, by the Finnish Patent Office as the International Searching Authority for International Application No. PCT/FI2015/050586.
(Continued)

*Primary Examiner* — Mussa A Shaawat
*Assistant Examiner* — Kyung J Kim
(74) *Attorney, Agent, or Firm* — Buchanan Ingersoll & Rooney PC

(57) ABSTRACT

An exemplary sensor device provides marine vessel data of a marine vessel without integration to the marine vessel's information systems. The sensor device includes a receiver configured to receive at least position and time information relating to the marine vessel. At least one sensor is configured to measure marine vessel performance data. The at least one sensor can measure the marine vessel performance data when the sensor device is affixed to the hull structure of the marine vessel. At least one processor is configured to perform frequency analysis of the measured marine vessel performance data and to generate marine vessel data based on the received at least position and time information and the frequency analyzed marine vessel performance data.

30 Claims, 3 Drawing Sheets

(51) Int. Cl.
*G01C 9/00* (2006.01)
*G01C 21/20* (2006.01)
*G07C 5/00* (2006.01)
*B63B 9/00* (2006.01)

(56) References Cited

U.S. PATENT DOCUMENTS

| | | | |
|---|---|---|---|
| 7,133,801 B2 | 11/2006 | Song | |
| 7,139,182 B2 | 11/2006 | Song | |
| 8,643,509 B1 | 2/2014 | Chen et al. | |
| 2003/0220469 A1 | 12/2003 | Song | |
| 2005/0052889 A1 | 3/2005 | Song | |
| 2005/0169030 A1 | 8/2005 | Song | |
| 2005/0209814 A1 | 9/2005 | Song | |
| 2006/0203529 A1 | 9/2006 | Song | |
| 2007/0032966 A1 | 2/2007 | Song | |
| 2010/0302908 A1 | 12/2010 | Strong | |
| 2013/0174769 A1* | 7/2013 | Aharonian | B63B 35/44 114/71 |
| 2013/0197728 A1 | 8/2013 | Blackwood | |
| 2015/0088346 A1 | 3/2015 | Lee | |

FOREIGN PATENT DOCUMENTS

| | | |
|---|---|---|
| CN | 202548139 U | 11/2012 |
| CN | 103383254 A | 11/2013 |
| CN | 104508422 A | 4/2015 |
| DE | 4226773 A1 | 2/1994 |
| JP | 2002-123884 A | 4/2002 |
| KR | 20130135138 A | 12/2013 |
| WO | WO 2009/080068 A1 | 7/2009 |
| WO | WO 2011/027032 A | 3/2011 |

OTHER PUBLICATIONS

Written Opinion (PCT/ISA/237) dated Dec. 11, 2015, by the Finnish Patent Office as the International Searching Authority for International Application No. PCT/FI2015/050586.

Internationa Preliminary Report on Patentability (PCT/IPEA/409) dated Oct. 27, 2016, by the Finnish Patent Office as the International Preliminary Examining Authority for International Application No. PCT/FI2015/050586,.

Search Report dated Feb. 25, 2015, by the European Patent Office for Application No. 14183932.4.

Office Action dated Apr. 4, 2017 by the Canadian Intellectual Property Office in corresponding Canadian Patent Application No. 2,960,431. (4 pages).

English Translation of Chinese Office Action (First Notification of Office Action) dated May 9, 2018, by the Chinese Patent Office in corresponding Chinese Patent Application No. 201580056147.5. (10 pages).

* cited by examiner

SENSOR DEVICE FOR PROVIDING MARINE VESSEL DATA

TECHNICAL FIELD

The invention relates to a sensor device for providing marine vessel data.

BACKGROUND

Fuel efficiency is an important factor when operating marine vessels. Only a slight reduction in fuel consumption, for example 1-2%, may produce a significant monetary reduction in operating costs of a marine vessel. Thus, there is a constant challenge to operate the marine vessel with as low costs as possible in terms of fuel efficiency.

There are several parameters that have an effect on the total fuel efficiency of a marine vessel, for example, speed through water, speed over ground, draught, trim, propeller efficiency, wind direction and velocity, and significant wave height and direction. Most of these parameters are such that they can be somehow measured by the marine vessel itself and that the marine vessel's information systems have this information available. Further, some parameters may require a separate sensor or sensors to be installed in order to be able to record the parameter values. For example, to measure RPM (Revolutions Per Minute) of a propeller, it may be necessary to install a sensor to the propeller shaft or the main engine if the marine vessel cannot provide the RPM information otherwise.

If there is a desire to perform a more detailed analysis of some or all of these parameters when analyzing, for example, fuel efficiency of a marine vessel, typically one has to have an access to the marine vessel's information systems in order to access the necessary pieces of information. Additionally, as discussed above, it may also be necessary to install new sensors to have the necessary information available.

Integration to the systems of a marine vessel, in order to have access to desired parameters of the marine vessel, is a complicated and time consuming task. Since systems of marine vessels usually differ from each other, the integration task is usually also vessel-specific. This means that for each marine vessel, the marine vessel has to be inspected thoroughly in order to be able to determine how the integration can be done and what needs to be done. The integration task also requires specific skills from the people implementing the integration or even a third party service engineer to visit the ship.

SUMMARY

According to one aspect of the invention, there is provided a sensor device for providing marine vessel data of a marine vessel. The sensor device comprises a receiver for receiving automatic identification system data sent by the marine vessel; at least one sensor for measuring marine vessel performance data, the at least one sensor being able to measure the marine vessel performance data when the sensor device is affixed to the hull structure of the marine vessel; and a processor for generating marine vessel data based on the received automatic identification system data and the marine vessel performance data, the marine vessel data comprising data relating to the marine vessel performance data measured by the at least one sensor and at least part of the received automatic identification system data.

In one example, the sensor device comprises at least one memory for storing the generated marine vessel data.

In one example, the sensor device comprises a data interface, wherein the at least one processor is arranged to transmit the generated marine vessel data via the data interface to an external device. The data interface may be a wireless transmitter, a wireless transceiver or a port.

In one example, the at least one sensor for measuring marine vessel performance data comprises an acceleration sensor operable to measure vibrations of the hull structure and/or motions of the marine vessel.

In one example, the at least one sensor for measuring marine vessel performance data comprises at least one gyroscope operable to measure motions of the marine vessel.

In one example, the at least one sensor for measuring marine vessel performance data comprises at least one inclinometer operable to measure inclination of the marine vessel.

In one example, the sensor device comprises the processor that is configured to analyze the marine vessel performance data measured by at least one sensor, and to prepare the data relating to the marine vessel performance data in response to the analysis.

In one example, the sensor device comprises an antenna for receiving a wireless transmission comprising the automatic identification system data.

In one example, the receiver is configured to receive the automatic identification system data from an antenna external to the sensor device.

In one example, the generated marine vessel data comprises marine vessel performance data measured by the at least one sensor and the received automatic identification system data.

According to another aspect of the invention, there is provided a method for providing marine vessel data of a marine vessel with a sensor device. The method comprises receiving, with a receiver, automatic identification system data sent by the marine vessel; measuring, with at least one sensor of the sensor device, marine vessel performance data, the at least one sensor being able to measure the marine vessel performance data when the sensor device is affixed to the hull structure of the marine vessel; and generating, with at least one processor, marine vessel data based on the received automatic identification system data and marine vessel performance data, the marine vessel data comprising data relating to the marine vessel performance data measured by the at least one sensor and at least part of the received automatic identification system data.

In one example, the method comprises storing the generated marine vessel data in at least one memory of the sensor device.

In one example, the method comprises causing transmission of the generated marine vessel data to an external device via a data interface.

In one example, the at least one sensor for measuring marine vessel performance data comprises an acceleration sensor operable to measure vibrations of the hull structure and/or motions of the marine vessel.

In one example, the at least one sensor for measuring marine vessel performance data comprises at least one gyroscope operable to measure motions of the marine vessel.

In one example, the at least one sensor for measuring marine vessel performance data comprises at least one inclinometer operable to measure inclination of the marine vessel.

In one example, the method further comprises analyzing the marine vessel performance data measured by at least one sensor, and preparing the data relating to the marine vessel performance data in response to the analysis.

In one example, the generated marine vessel data comprises marine vessel performance data measured by the at least one sensor and the received automatic identification system data.

According to another aspect of the invention, there is provided a computer program comprising program code instructions, which when executed by a processing unit, perform the following: causing receipt of automatic identification system data sent by a marine vessel; causing measurement, with at least one sensor, of marine vessel performance data, the at least one sensor being able to measure the marine vessel performance data when the sensor device is affixed to the hull structure of the marine vessel; and generating marine vessel data based on the received automatic identification system data and marine vessel performance data, the marine vessel data comprising data relating to the marine vessel performance data measured by the at least one sensor and at least part of the received automatic identification system data.

According to another aspect of the invention, there is provided a sensor device for providing marine vessel data of a marine vessel. The sensor device comprises a receiver for receiving automatic identification system data sent by the marine vessel; at least one sensor for measuring marine vessel performance data; and at least one processor for generating marine vessel data based on the received automatic identification system data and the marine vessel performance data, the marine vessel data comprising data relating to the marine vessel performance data measured by the at least one sensor and at least part of the received automatic identification system data.

In one example, the generated marine vessel data comprises marine vessel performance data measured by the at least one sensor and the received automatic identification system data.

According to another aspect of the invention, there is provided a sensor device for providing marine vessel data of a marine vessel without integration to the marine vessel's information systems. The sensor device comprises a receiver configured to receive at least position and time information relating to the marine vessel, at least one sensor configured to measure marine vessel performance data, the at least one sensor being able to measure the marine vessel performance data when the sensor device is affixed to the hull structure of the marine vessel, and at least one processor configured to perform frequency analysis of the measured marine vessel performance data and to generate marine vessel data based on the received at least position and time information and the frequency analyzed marine vessel performance data.

In one example, the receiver is configured to receive automatic identification system data sent by the marine vessel, and wherein the at least one processor is configured to generate the marine vessel data based on the received automatic identification system data and the frequency analyzed marine vessel performance data.

In one example, the sensor device further comprises at least one memory configured to store the generated marine vessel data.

In one example, the sensor device further comprises a data interface, wherein the at least one processor is configured to transmit the generated marine vessel data via the data interface to an external device. In one example, the data interface is a wireless transmitter, a wireless transceiver or a port.

In one example, the at least one sensor configured to measure marine vessel performance data comprises an acceleration sensor operable to measure vibrations of the hull structure and/or motions of the marine vessel.

In one example, the at least one sensor configured to measure marine vessel performance data comprises at least one gyroscope operable to measure motions of the marine vessel.

In one example, the at least one sensor configured to measure marine vessel performance data comprises at least one inclinometer operable to measure inclination of the marine vessel.

In one example, the at least one processor is configured to analyze the signals measured by at least one of the accelerometer, inclinometer or gyroscope to identify the fundamental frequency in the signals in order to determine speed of rotation of a propeller of the marine vessel or of the main engine.

In one example, the at least one processor is configured to analyze the signals measured by at least one of the accelerometer, gyroscope or inclinometer to identify the main components of the frequency spectrum of the signals by applying a dimensionality reduction method.

In one example, the marine vessel data comprises at least one of the following marine vessel parameters: time, position, speed over ground, course over ground, true heading, rate of turn, estimated time of arrival, draft, trim, list, pitching, surging, rolling, swaying, yawing, heaving, vibrations in three dimensions, and propeller or engine revolutions per minute.

In one example, the at least one processor is configured to automatically calibrate the inclinometer by mathematically turning the inclinometer to the right position based on the speed over ground, time, pitch and roll information.

In one example, the at least one processor is configured to determine an optimized trim value based on the trim, the draft and the speed over ground information.

In one example, the at least one processor is configured to determine an optimized speed over ground value based on the speed over ground, draft and the propeller or engine revolutions per minute.

In one example, the at least one processor is configured to determine the amount of propeller slip based on the speed over ground and the propeller or engine revolutions per minute.

According to another aspect, there is provided a method providing marine vessel data of a marine vessel with a sensor device without integration to the marine vessel's information systems. The method comprises receiving, with a receiver, at least position and time information relating to the marine vessel, measuring, with at least one sensor of the sensor device, marine vessel performance data, the at least one sensor being able to measure the marine vessel performance data when the sensor device is affixed to the hull structure of the marine vessel, performing, with at least one processor, frequency analysis of the measured marine vessel performance data, and generating, with the at least one processor, marine vessel data based on the received at least position and time information and the frequency analyzed marine vessel performance data.

In one example, the receiving comprises receiving automatic identification system data sent by the marine vessel, and generating the marine vessel data based on the received automatic identification system data and the frequency analyzed marine vessel performance data.

In one example, the method further comprises storing the generated marine vessel data in at least one memory of the sensor device.

In one example, the method further comprises causing transmission of the generated marine vessel data to an external device via a data interface.

In one example, the at least one sensor for measuring marine vessel performance data comprises an acceleration sensor operable to measure vibrations of the hull structure and/or motions of the marine vessel.

In one example, the at least one sensor for measuring marine vessel performance data comprises at least one gyroscope operable to measure motions of the marine vessel.

In one example, the at least one sensor for measuring marine vessel performance data comprises at least one inclinometer operable to measure inclination of the marine vessel.

In one example, the method further comprises analyzing the signals measured by at least one of the accelerometer, inclinometer or gyroscope to identify the fundamental frequency in the signals in order to determine speed of rotation of a propeller of the marine vessel or of the main engine.

In one example, the method further comprises analyzing the signals measured by at least one of the accelerometer, gyroscope or inclinometer to identify the main components of the frequency spectrum of the signals by applying a dimensionality reduction method.

In one example, the marine vessel data comprises at least one of the following marine vessel parameters: time, position, speed over ground, course over ground, true heading, rate of turn, estimated time of arrival, draft, trim, list, pitching, surging, rolling, swaying, yawing, heaving, vibrations in three dimensions, and propeller or engine revolutions per minute.

In one example, the method further comprises determining an optimized the speed over ground value based on the speed over ground, draft and the propeller or engine revolutions per minute.

In one example, the method further comprises determining the amount of propeller slip based on the speed over ground and the propeller or engine revolutions per minute.

In one example, the method further comprises automatically calibrating the inclinometer by mathematically turning the inclinometer to the right position based on the speed over ground, time, pitch and roll information.

In one example, the method further comprises determining an optimized trim value based on the trim, draft and speed over ground information.

According to another aspect, there is provided a computer program comprising program code instructions, which when executed by a processing unit, perform the following: causing receipt of at least position and time information relating to the marine vessel, causing measurement, with at least one sensor, of marine vessel performance data, the at least one sensor being able to measure the marine vessel performance data when the sensor device (100A, 100B, 100C, 200) is affixed to the hull structure of the marine vessel, performing frequency analysis of the measured marine vessel performance data, and generating marine vessel data based on the received at least position and time information and the frequency analyzed marine vessel performance data It is also possible to combine one or more of the above examples to form a further example of the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1A:
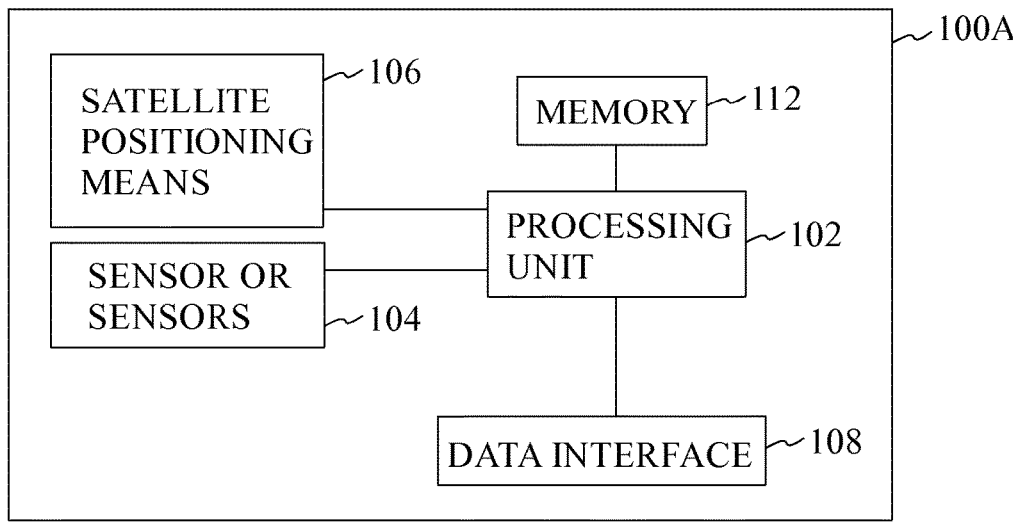
FIG. 1A is a block diagram illustrating a sensor device according to one example.

FIG. 1A is a block diagram illustrating a sensor device 100A according to one example of the invention. The sensor device 100A comprises a processing unit 102, a sensor or sensors 104 for measuring marine vessel performance data and position and time determining means 106 for acquiring position and time information for the marine vessel connected to the processing unit 102. In this example, the satellite positioning means 106 comprise for example, Global Positioning System (GPS). The sensor or sensors 104 is/are able to measure the marine vessel performance data when the sensor device is affixed to the hull structure of the marine vessel. For example, bolting, gluing or any other way for affixing the sensor device 100A to the hull structure may be used. In other words, since the sensor device 100A is firmly attached to the hull structure, there is no relative motion between the sensor device 100A and the hull structure, and thus the sensor or sensors 104 sense the motions and vibrations of the marine vessel via the hull structure.

The processing unit 102 is configured to generate marine vessel data. The marine vessel data comprises data relating to the marine vessel performance data measured by the at least one sensor and data received with the satellite positioning means 106. In another example, the processing unit 102 is configured to perform frequency analysis of the measured marine vessel performance data and to generate marine vessel data based on the received at least position and time information and the frequency analyzed marine vessel performance data. When frequency analysis is performed by the sensor device, the amount of data to be transmitted outside the sensor device is reduced. The data received with the satellite positioning means 106 comprises, for example, position and time information of the marine vessel. The data relating to the marine vessel performance data measured by the at least one sensor may comprise measured data values as they were measured and/or data after processing at least some of the measured data values first. In another example, the sensor device has a clock and time information is taken from the clock. The marine vessel data may be stored on a memory 112 connected to the processing unit 102. It is evident that the sensor device may store a set of marine vessel data on the memory 112 and it is thus possible to determine changes in various marine vessel specific parameters by analyzing the set of marine vessel data.

The sensor device 100A may comprise also a data interface 108 connected to the processing unit 102. The data interface 108 may be configured to transmit, for further analysis, the marine vessel data stored in the memory 112. The data interface 108 is, for example, a wireless transmitter or a wireless transceiver (for example, Wireless Local Area Network (WLAN) transceiver or any mobile or cellular communication network transceiver (for example, Wideband Code Division Multiple Access (WCDMA), Long Term Evolution (LTE) etc.) or a local data transmission port (for example, Ethernet, Universal Serial Bus (USB) etc.).

The memory 112 may also store information identifying the marine vessel. This information may have been preconfigured to the sensor device 100A.

In another example, the sensor device 100A may not comprise the memory 112. Instead, the processing unit 102 transmits the marine vessel data directly to the data interface 108 without storing.

Figure 1B:
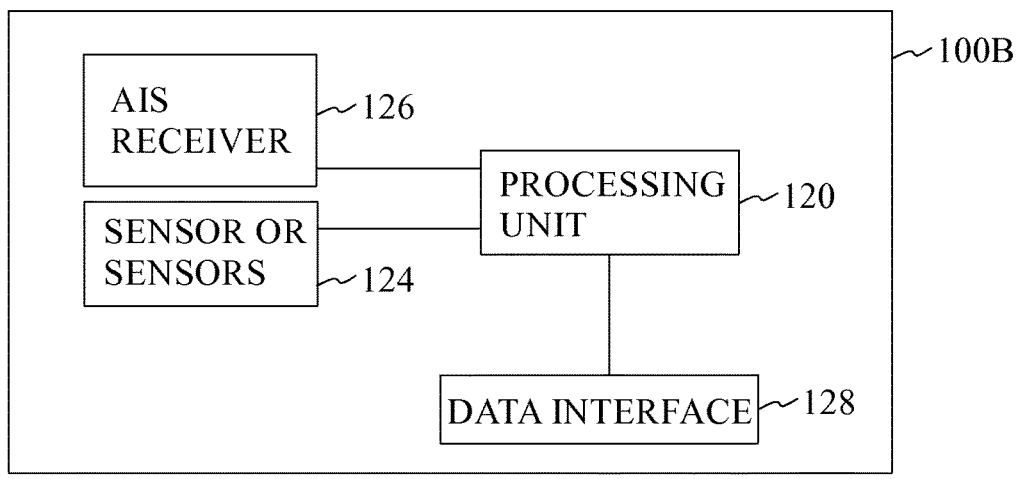
FIG. 1B is a block diagram illustrating a sensor device according to another example.

FIG. 1B is a block diagram illustrating a sensor device 100B according to another example of the invention. The sensor device 100B comprises a processing unit 120, a sensor or sensors 124 sensor for measuring marine vessel performance data, and an automatic identification system (AIS) receiver 126 for receiving a wireless transmission comprising automatic identification system data from the marine vessel. The AIS receiver 126 may include an antenna configured to receive the automatic identification system data or the sensor device 100B may include an antenna configured to receive the automatic identification system data. In another example, the AIS receiver 126 is configured to receive the automatic identification system data from an antenna external to the sensor device 100B.

The processing unit 120 is configured to generate marine vessel data based on the received automatic identification system data and marine vessel performance data. The marine vessel data comprises data relating to the marine vessel performance data measured by the at least one sensor and at least part of the received automatic identification system data. The at least part of the received automatic identification system data comprises, for example, position and time information of the marine vessel. In another example, the sensor device 100B has a clock and time information is taken from the clock. The marine vessel data may also comprise information identifying the marine vessel (for example, International Maritime Organization (IMO) ship identification number or Maritime Mobile Service Identity (MMSI)). This identifying information may be taken from the automatic identification system signal. The data relating to the marine vessel performance data measured by the at least one sensor may comprise measured data values as they were measured and/or data after processing at least some of the measured data values first.

The sensor device 100B may comprise also a data interface 128 connected to the processing unit 120. The processing unit 120 is configured to transmit via the data interface 128 the generated marine vessel data. The data interface 128 is, for example, a wireless transmitter or a wireless transceiver (for example, Wireless Local Area Network (WLAN) transceiver or any mobile or cellular communication network transceiver (for example, Wideband Code Division Multiple Access (WCDMA), Long Term Evolution (LTE) etc.) or a local data transmission port (for example, Ethernet, Universal Serial Bus (USB) etc.).

The sensor device 100B may also store information identifying the marine vessel. This may have been preconfigured to the sensor device 100B. Since the automatic identification system data identifies the marine vessel to which the received data relates to, the sensor device 100B is thus able to make sure that the received automatic identification system data relates to the marine vessel to which the sensor device is affixed. One possibility for identifying the correct marine vessel is to use, for example, signal strength of the AIS signal. The strongest AIS signal relates to the marine vessel to which the sensor device is attached. Yet another possibility is to compare the acceleration signal from the acceleration sensor to the data indicating vessel movements in the AIS signals and to determine the correct AIS signal based on the comparison.

The sensor or sensors 124 is/are able to measure the marine vessel performance data when the sensor device is affixed to the hull structure of the marine vessel. For example, bolting, gluing or any other way for affixing or attaching the sensor device 100B to the hull structure may be used. In other words, since the sensor device 100B is firmly attached to the hull structure, there is no relative motion between the sensor device 100B and the hull structure, and thus the sensor or sensors 124 sense the motions and vibrations of marine vessel via the hull structure.

The AIS receiver 126 may receive a wireless transmission comprising an AIS signal from the same marine vessel to which the sensor device 100B is affixed. The sensor device 100B may beforehand store information identifying the marine vessel (for example, International Maritime Organization (IMO) ship identification number or Maritime Mobile Service Identity (MMSI)) so that it is able to determine that the AIS signal relates to the marine vessel to which it is affixed. The AIS signal includes several pieces of information relating to the marine vessel, for example, the vessel's identity, type, position, course, speed, navigational status and other safety-related information. The sensor device 100B may transmit via the data interface 128 the AIS signal as it was received (in other words, every piece of information contained in the AIS signal). In another example, the sensor device 100B may select a subset of information included in the AIS signal to be included in the marine vessel data. In one example, the subset includes at least position and time information of the marine vessel.

Figure 1C:
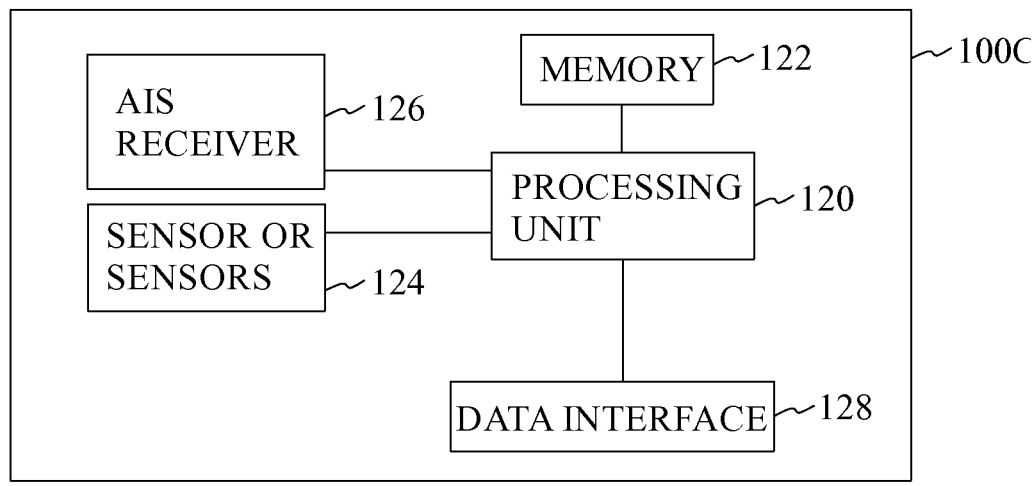
FIG. 1C is a block diagram illustrating a sensor device according to another example.

FIG. 1C is a block diagram illustrating a sensor device 100C according to another example of the invention. The sensor device 100C of FIG. 1C differs from the sensor device 100B of FIG. 1B that it comprises also at least one memory 122 connected to the processing unit 120 for storing the marine vessel data generated by the processing unit 120. The memory 122 may act as a cache memory or a long-term memory to which the processing unit 120 stores the marine vessel data before it is later transmitted to an external device via the data interface 128. The memory 122 may be a volatile or non-volatile memory. If the memory 122 is volatile, the marine vessel data remains stored in the memory 122, for example, until the sensor device 100C is switched off. If the memory 122 is non-volatile, the marine vessel data remains stored in the memory 122 even if the sensor device 100C is switched off. Thus, in the example of FIG. 1C, the processing unit 120 may not instantly transmit the marine vessel data via the data interface 128 but the marine vessel data is stored on the memory 122. If the memory 122 is non-volatile, the sensor device 100C may store there data relating to a longer time period, for example, several hours or days and only later transmit the stored data.

Normally the AIS signal is intended to assist a vessel's watch standing officers to track and monitor movements of other vessels and also allow maritime authorities to track and monitor movements of vessels. It also identifies and locates vessels by electronically exchanging data with other nearby ships. In the example disclosed in FIGS. 1B and 1C, the AIS signal is received by a sensor device installed in a vessel that is sending the AIS signal. This makes it possible for the sensor device to link the AIS signal with other marine vessel performance data measured by the sensor or sensors 124. Since the sensor device 100B has the information included in the AIS signal and measurements from one or more sensors, there is no need to make the traditional integration tasks to the marine vessel's information systems. The AIS signal sent by the marine vessel to the sensor device is a strong signal. Therefore, it may not be necessary to install a separate antenna in order to be able to receive the AIS signal. This makes the installation of the sensor device simpler and quicker. Therefore, in one example, it is possible to install the sensor device 100B including only an internal antenna inside a marine vessel because the AIS signal leaks to the interior of the marine vessel via various existing cables.

The data interface 108 and 128 disclosed in FIGS. 1A, 1B and 1C may be a wireless using any suitable radio frequency or frequencies to transmit information to external entities. The wireless transmitter may be a Wireless Local Area Network (WLAN) transmitter or a transmitter that is able to transmit data via any mobile communication network. Alternatively, the transmitter 108, 128 may be a transmitter transmitting information via a wired connection, for example, an Ethernet port, Universal Serial Port (USB) or via any other local interface.

In another example, the data interface 108, 128 may refer to a transceiver that is able to receive and transmit information (for example, Wireless Local Area Network (WLAN) transceiver or any mobile or cellular communication network transceiver (for example, Wideband Code Division Multiple Access (WCDMA), Long Term Evolution (LTE) etc.). The data interface 108, 128 may receive a request for marine vessel data stored in the memory. In response to the request the processing unit 102, 120 may be configured to cause the data interface 108, 128 to transmit the marine vessel data. This means that an external entity is able to request or download information from the sensor device 100A, 100B, 100C while the sensor device 100A, 100B, 100C is operational and in use in a marine vessel.

Figure 2:
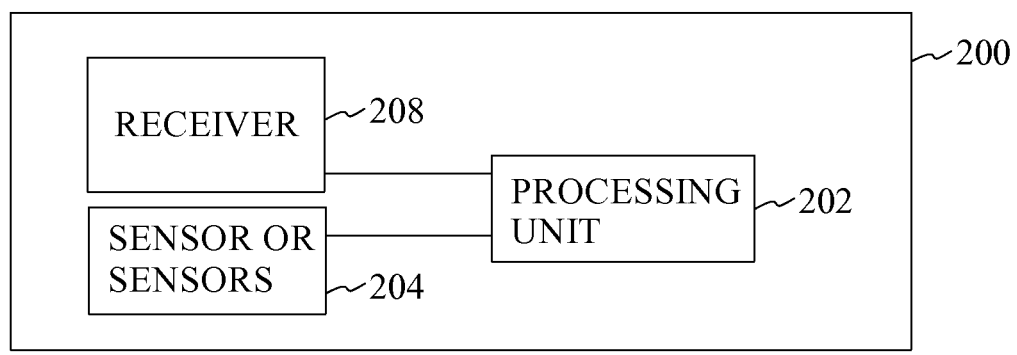
FIG. 2 is a block diagram illustrating a sensor device according to another example.

FIG. 2 is a block diagram illustrating a sensor device 200 according to another example. The sensor device 200 comprises a processing unit 202, a sensor or sensors 204 sensor for measuring marine vessel performance data, and a receiver 208 for receiving at least position and time information relating to the marine vessel. The receiver 208 may refer to satellite positioning means, for example, Global Positioning System (GPS). In another example, the receiver 208 is an AIS receiver for receiving a wireless transmission comprising automatic identification system (AIS) data from the marine vessel. The receiver 208 may include an antenna configured to receive the automatic identification system data or the sensor device 200 may include an antenna configured to receive the automatic identification system data.

The sensor device 200 comprises also a processing unit 202 configured to generate marine vessel data. If the receiver 208 is an AIS receiver, the marine vessel data comprises data relating to the marine vessel performance data measured by the at least one sensor and at least part of the received automatic identification system data. The data relating to the marine vessel performance data measured by the at least one sensor may comprise measured data values as they were measured and/or data after processing at least some of the measured data values first. In one example, the at least part of the received automatic identification system data comprises at least position and time information of the marine vessel. In other words, position information and possibly also time information is taken from the AIS signal. If the receiver 208 refers to satellite positioning means, the marine vessel data comprises data relating to the marine vessel performance data measured by the at least one sensor and at least position and time information of the marine vessel. The time and position information is provided by signals received by the satellite positioning receiver 208. The data relating to the marine vessel performance data measured by the at least one sensor may comprise measured data values as they were measured and/or data after processing at least some of the measured data values first.

The sensor or sensors 204 is/are able to measure the marine vessel performance data when the sensor device is affixed to the hull structure of the marine vessel. For example, bolting, gluing or any other way for affixing the sensor device 200 to the hull structure may be used. In other words, since the sensor device 200 is firmly attached to the hull structure, there is no relative motion between the sensor device 200 and the hull structure, and thus the sensor or sensors 204 sense the motions and vibrations of marine vessel via the hull structure.

If the receiver 208 is an AIS receiver, the AIS receiver may receive a wireless transmission comprising an AIS signal from the same marine vessel to which the sensor device 200 is affixed. The sensor device 200 may beforehand store information identifying the marine vessel (for example, International Maritime Organization (IMO) ship identification number or Maritime Mobile Service Identity (MMSI)) so that it is able to determine that the AIS signal relates to the marine vessel to which it is affixed. The AIS signal includes several pieces of information relating to the marine vessel, for example, the vessel's identity, type, position, course, speed, navigational status and other safety-related information.

Normally the AIS signal is intended to assist a vessel's watch standing officers to track and monitor movements of other vessels and also allow maritime authorities to track and monitor movements of vessels. It also identifies and locates vessels by electronically exchanging data with other nearby ships. In the example disclosed in FIG. 2, the AIS signal is received by a sensor device installed in a vessel that is sending the AIS signal. This makes it possible for the sensor device to link the AIS signal with other marine vessel performance data measured by the sensor or sensors 204. Since the sensor device 200 has the information included in the AIS signal and measurements from one or more sensors, there is no need to make the traditional integration tasks to the marine vessel's information systems. The AIS signal sent by the marine vessel to the sensor device is a strong signal. Therefore, it may not be necessary to install a separate antenna in order to be able to receive the AIS signal. This makes the installation of the sensor device simpler and quicker. Therefore, in one example, it is possible to install the sensor device 200 including only an internal antenna inside a marine vessel because the AIS signal leaks to the interior of the marine vessel via various existing cables.

Although not disclosed in FIGS. 1A, 1B, 1C and 2, the sensor devices 100A, 100B, 100C, 200 may comprise powering means for providing operating power to the device. The powering means may refer to an internal battery or to an interface that receives operating power from an external source.

FIGS. 1A, 1B, 1C and 2 illustrate examples where no integration is required to the vessel's systems in order to have marine vessel performance data available for further analysis. This generates significant cost savings since no vessel-specific integration tasks need to be performed. The earlier required integration to the vessel's systems also required careful planning and trained and skilled persons to perform the integration tasks. With the solution disclosed in FIGS. 1A, 1B, 1C and 2, installation of the sensor device can be performed by a person who need not have profound understanding of the marine vessel's information systems.

The sensor device 100A, 100B, 100C and 200 disclosed in FIGS. 1A, 1B, 1C and 2 may include at least one accelerometer or three-dimensional accelerometer. Since the sensor device is affixed to the hull of the marine vessel, the accelerometer is able to sense vibrations in the hull. From the vibrations from the hull sensed by the accelerometer, it is possible to determine, for example, speed of rotation of a propeller of the marine vessel or of the main engine. In most vessels, the speed of rotation of the propeller is identical with the speed of rotation of an engine of a marine vessel. Thus, it is possible to determine, based on an analysis of the measurements of the accelerometer, the speed of rotation of a propeller and an engine of a marine vessel.

In one example of FIGS. 1A, 1B, 1C and 2, in order to determine the speed of rotation of the propeller, the sensor device may analyze the signals measured by the accelerometer to identify the fundamental frequency in the signals. The fundamental frequency is the RPM (Revolutions Per Minute) of the engine or its multiple. One possible method for pitch detection (i.e. find the fundamental frequency) is the Harmonic Product Spectrum (HPS) method. In the method a spectrum is compressed a number of times (downsampling), and it is compared with the original spectrum. It can then be seen that the strongest harmonic peaks line up. The first peak in the original spectrum coincides with the second peak in the spectrum compressed by a factor of two, which coincides with the third peak in the spectrum compressed by a factor of three. Hence, when the various spectrums are multiplied together, the result will form a clear peak at the fundamental frequency. It is obvious that the HPS is only one possible method for finding the fundamental frequency and also other methods may be used. The speed of rotation of the propeller may also be stored in the memory of the sensor device to be transmitted to or accessed by an external entity.

Further, in one example of the sensor device 100A, 100B, 100C or 200 disclosed in FIGS. 1A, 1B, 1C and 2, the sensor device 100A, 100B, 100C and 200 may perform frequency analysis of the signals measured by at least one acceleration sensor of the sensor device 100A, 100B, 100C or 200. When frequency analysis is performed by the sensor device, the amount of data to be transmitted outside the sensor device is reduced. The frequency analysis may comprise, for example, frequency-time analysis, such as Short-Time Fourier Transform (STFT) or Discrete Wavelet Transform (WFT). With the frequency analysis an understanding of frequency components over a short time is received. The frequency analysis is performed, for example, so that motions of a marine vessel can be understood better and also analyzed.

Further, the frequency analysis may comprise applying a dimensionality reduction method, for example, Principal Component Analysis (PCA) in order to identify the most significant components in the frequency domain. The acceleration sensor senses both the direction of earth gravity and motions of acceleration caused by the hull of the marine vessel to different directions. For example, if the marine vessel sways and simultaneously rolls, an acceleration sensor senses (1) the inclination, (2) sidewise acceleration of the marine vessel, (3) the centrifugal force caused by rolling and (4) the centrifugal force caused by change in the direction of the marine vessel.

The sensor device 100A, 100B, 100C or 200 disclosed in FIGS. 1A, 1B, 1C and 2 may include at least one gyroscope. Based on the measurements of a gyroscope, it is possible to determine, for example, roll of the marine vessel. While an accelerometer sees simultaneously acceleration and inclination the gyroscope sees the real inclination of the marine vessel. The gyroscope senses angular rate of motion. From the angular rate of motion it is also possible to calculate inclination by integrating with respect to time. It may be there is a small offset with the gyroscope at the zero position. This can be rectified, for example, by combining data from the acceleration sensor and the gyroscope using Kalman filtering.

The sensor device 100A, 100B, 100C and 200 disclosed in FIGS. 1A, 1B, 1C and 2 may include at least one inclinometer. Based on the measurements from an inclinometer, it is possible to determine pitch and/or roll of a marine vessel accurately. If a quasistatic position of the marine vessel is to be determined, the measured signal from the inclinometer can be filtered with a low-pass filter, where the threshold frequency is 30-60 seconds. This filtering operation filters out motions. Further, the measurements of the inclinometer may also be used in determining trim of the marine vessel.

In one example, the sensor device is configured to analyze the signals measured by at least one of the accelerometer, inclinometer or gyroscope to identify the fundamental frequency in the signals in order to determine speed of rotation of a propeller of the marine vessel or of the main engine. The sensor device may also analyze the signals measured by at least one of the accelerometer, gyroscope or inclinometer to identify the main components of the frequency spectrum of the signals by applying a dimensionality reduction method.

An accelerometer and an inclinometer can be used to measure the same parameters since both of them measure acceleration. One of the main differences is that the accelerometer provides acceleration components separately but they are more inaccurate. However, acceleration components are usually provided within a larger dynamic range. The inclinometer measures inclination more accurately but within a narrower range. Therefore, it is possible to perform RPM measurements also with the inclinometer if its bandwidth is high enough. Further, it may be possible to perform a frequency analysis for the data provided by the inclinometer and get the same or almost the same results than based on accelerometer data. One difference, however, is that the inclinometer does not measure vertical acceleration.

The processing unit disclosed in FIG. 1A, 1B, 1C or 2 may include at least one memory, or there may be at least one memory external to the processing unit, and the at least one memory may comprise one or more computer programs, which when executed by the processing unit, control the operations of the sensor device 100A, 100B, 100C, 200. It is also possible that the sensor device 100A, 100B, 100C, 200 comprises more than one processing unit. The processing unit may be any unit (for example, a processor, a microcontroller etc.) that is able to process data and/or control the operations of the sensor device.

In one example of FIG. 1A, 1B, 1C or 2 the AIS data or the data from the satellite positioning means, for example GPS, may be used for automatic rotation calibration of the sensor (inclinometer). This means that the sensor is mathematically turned to the right position. This is important in order to be able to measure pitch of the marine vessel accurately. The amount of pitch of the marine vessel is much less than the amount of roll of the marine vessel. This results in a "leak" of roll to pitch if the sensor does not exactly align with the longitudinal axis of the marine vessel. In order to make the mathematical correction, knowledge of speed over ground, time, pitch and roll of the marine vessel is needed. Based on speed over ground it is possible to calculate or estimate acceleration/deacceleration of the marine vessel, which is seen by the inclinometer as change in longitudinal angle. This, in turn, can be used to calculate the direction where the marine vessel's bow resides. Rotation calibration can be fine-tuned based on rolling and pitching of the marine vessel. Rolling of the marine vessel is much stronger than pitching. Using, for example, a two-dimensional Principal Component Analysis (PCA) on the pitch and roll motions it is possible to accurately calculate to which direction the marine vessel rolls.

In one example of FIG. 1A, 1B, 1C or 2, an external computer may be arranged to connect to the data interface of the sensor device and to store data provided by the data interface on a memory of the external computer. The data interface may be a local port (for example, an Ethernet or a USB port) or a wireless data interface, for example, Bluetooth, WLAN etc. The external computer may listen to the data interface without sending any data or requests to the sensor device. Alternatively, the external computer may actively request data or directly read data from the memory of the sensor device via the data interface. The external computer may also comprise communication capabilities (for example, via a mobile communication network) for transmitting the information received from the sensor device. Another possibility is that the marine vessel data stored in the external computer is further stored on a portable memory device which is then sent to a desired recipient.

The sensors and the receiver of the sensor device disclosed in FIGS. 1A, 1B, 1C and 2 may provide a plurality of parameters relating to a marine vessel, for example one or more of the following:
 time
 position (latitude & longitude)
 SOG (speed over ground)
 COG (course over ground)
 HDT (true heading)
 ROT (rate of turn)
 ETA (estimated time of arrival)
 draft
 trim (pitch)
 list (roll)
 pitching, surging, rolling, swaying, yawing, heaving (and their characteristics like period, amplitude, harmonics etc.)
 vibrations in three dimensions
 propeller/engine RPM.

Based on the above described sensor device examples, it can be seen that when the sensors and receiver are arranged in a single sensor device, the sensor device is able provide a very comprehensive view of variables relating, for example, to energy efficiency of the marine vessel. Further, these variables are available without any integration to the systems of the marine vessel.

Based on the information available at the sensor device disclosed in FIGS. 1A, 1B, 1C and 2 it may be possible to, by the sensor device or by an external device processing data received from the sensor device, optimize and analyze various factors relating to energy efficiency of a marine vessel. For example, trim may be optimized based on trim, draft and speed information. Further, speed of the marine vessel may be optimized based on speed, draft and RPM information. The accuracy of trim and speed optimization can be further improved by utilizing the motions information as it provides an indirect indicator of waves encountered by the marine vessel and have impact on optimal trim and speed. If the sensor device uses information provided by satellite positioning means (as disclosed in FIG. 1A), draft information may not be automatically available. Therefore, draft information may be provided manually when performing trim and speed optimization.

Further, in the course of time, the hull of the marine vessel may accumulate fouling. This causes extra fuel consumption and is, therefore, not desirable. Excessive fouling in the hull of the marine vessel may be determined, for example, by monitoring the increase of the propeller slip. The amount of propeller slip can be calculated from the information provided by the sensor device. If the propeller slip is found to statistically increase, it may provide an indication of an increased fouling of the hull. Based on the speed and RPM information it is possible to measure or calculate the propeller slip.

A sensor device disclosed in FIG. 1A, 1B, 1C or 2 provides a powerful and simple solution for collecting important information relating to a marine vessel. This information may then be sent to an external device for further processing and analysis.

The skilled person also understands that a sensor device disclosed in FIG. 1A, 1B, 1C or 2 may comprise also other components or elements not disclosed in the figures.

The examples of FIGS. 1A, 1B, 1C and 2 have described that the data relating to the marine vessel performance data measured by the at least one sensor may comprise measured data values as they were measured and/or data after processing at least some of the measured data values first. This enables implementing different types of sensor devices depending on the needs of a particular implementation. In one implementation it may be necessary to implement only a simple sensor device which is configured to transmit information received from sensors and a satellite position means/AIS receiver without processing it further before transmission. Further processing may be performed later by an external device. In another implementation, at least some of the received information may be preprocessed with the sensor device before transmission to an external entity.

When the sensor device uses an AIS receiver, it is not necessary to use any satellite positioning means with the sensor device. If satellite positioning is used, a satellite positioning receiver needs to be installed to a location where it is possible to receive satellite positioning signals. This means that a sensor device would need an external satellite positioning antenna or that the sensor device has to be installed to an outdoor location in a marine vessel. An outdoor location, however, is problematic, for example, to an inclinometer because the accuracy of the inclinometer suffers or would need accurate temperature calibration. Further, if the sensor device is installed at an outside location, this exposes the sensor device to weather fluctuations, which raise manufacturing costs of the sensor device. When using the AIS signal, it is possible to install the sensor device interior of a marine vessel. Further, the AIS signal conveys also to the interior of the marine vessel since existing cabling in the marine vessel carry the AIS signals. Further, when AIS signals are used by the sensor device, it is possible to get more detailed information than when using satellite positioning signals. It is possible, for example, to receive true heading and rate of turn of the marine vessel.

Figure 3:
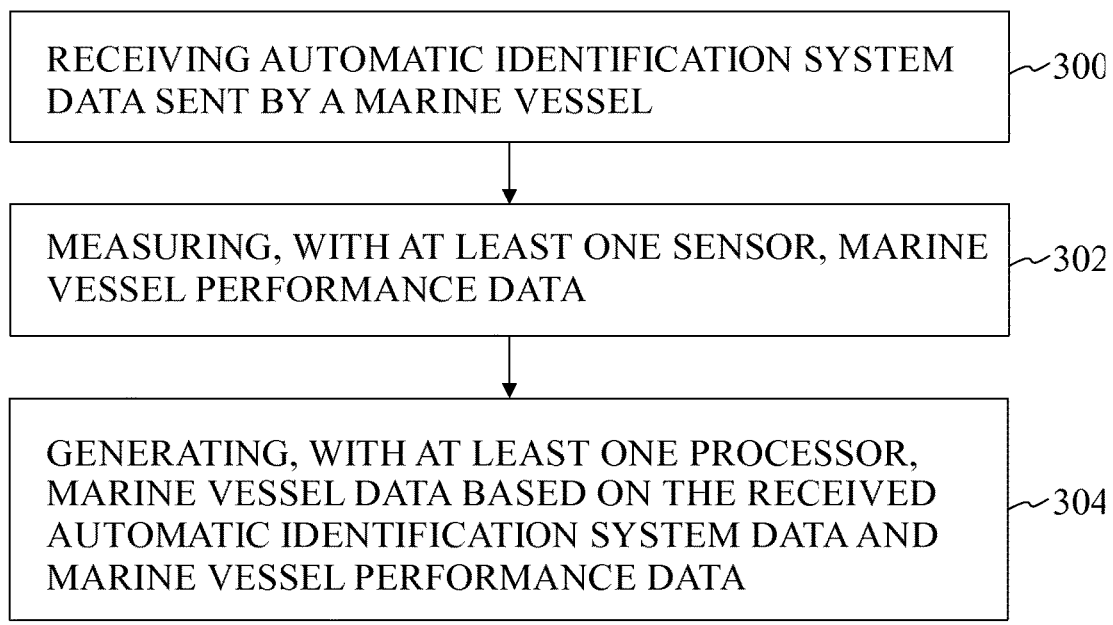
FIG. 3 is a block diagram illustrating a method according to one example.

FIG. 3 is a block diagram illustrating a method for providing marine vessel data of a marine vessel with a sensor device. At 300 a receiver receives automatic identification system data sent by the marine vessel. At 302 at least one sensor of the sensor device measures marine vessel performance data. In one example, the at least one sensor is able or configured to measure the marine vessel performance data when the sensor device is affixed to the hull structure of the marine vessel. At 304 at least one processor of the sensor device generates marine vessel data based on the received automatic identification system data and marine vessel performance data. The marine vessel data may comprise data relating to the marine vessel performance data measured by the at least one sensor and at least part of the received automatic identification system data.

Throughout the above description, the term "movement" is to be understood as movement of the marine vessel when its position changes from one place to another. The term "motion" is to be understood to mean the marine vessel's motion relative to its longitudinal or transverse, such as inclination etc. Furthermore, the term "hull structure" of the marine vessel as discussed in the above examples is to be understood to refer to any location or structure inside the marine vessel being able to convey motions and vibrations of marine vessel to the sensor device.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. Thus, the example embodiments are not limited to any specific combination of hardware and/or software.

The example embodiments disclosed above can include computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A sensor device for providing marine vessel data of a marine vessel, the sensor device comprising:
   a receiver configured to receive an identification signal including at least position and time information relating to the marine vessel;
   at least one sensor being configured to measure marine vessel performance data, the at least one sensor being configured to measure the marine vessel performance data based on a response of a hull structure of the marine vessel during operation of the marine vessel when the sensor device is affixed to the hull structure of the marine vessel;
   at least one processor configured to perform frequency analysis of the measured marine vessel performance data and to generate marine vessel data based on the received at least position and time information and the frequency analyzed marine vessel performance data; and
   a data interface enabling transmission of the generated marine vessel data to an external device,
   wherein the sensor device including the receiver, the at least one sensor, the at least one processor, and a data interface, is configured to provide at least the marine vessel data to the external device over the data interface without integration to the marine vessel's information systems.

2. The sensor device according to claim 1, wherein the receiver is configured to receive automatic identification system data sent by the marine vessel, the automatic identification system data comprising the position and time information, and wherein the at least one processor is configured to generate the marine vessel data based on the received automatic identification system data and the frequency analyzed marine vessel performance data.

3. The sensor device according to claim 1, comprising at least one memory configured to store the generated marine vessel data.

4. The sensor device according to claim 3, wherein the data interface is a wireless transmitter, a wireless transceiver or a port.

5. The sensor device according to claim 1, wherein the at least one sensor configured to measure marine vessel performance data comprises an acceleration sensor operable to measure vibrations of the hull structure and/or motions of the marine vessel.

6. The sensor device according to claim 1, wherein the at least one sensor configured to measure marine vessel performance data comprises at least one gyroscope operable to measure motions of the marine vessel.

7. The sensor device according to claim 1, wherein the at least one sensor configured to measure marine vessel performance data comprises at least one inclinometer operable to measure inclination of the marine vessel.

8. The sensor device according to claim 5, wherein the at least one processor is configured to analyze the signals measured by at least one of an accelerometer, inclinometer or gyroscope to identify a fundamental frequency in the signals in order to determine speed of rotation of a propeller of the marine vessel or of the main engine.

9. The sensor device according to claim 5, wherein the at least one processor is configured to analyze the signals measured by at least one of an accelerometer, gyroscope or inclinometer to identify main components of the frequency spectrum of the signals by applying a dimensionality reduction method.

10. The sensor device according to claim 1, wherein the marine vessel data comprises at least one marine vessel parameter selected from: time, position, speed over ground, course over ground, true heading, rate of turn, estimated time of arrival, draft, trim, list, pitching, surging, rolling, swaying, yawing, heaving, vibrations in three dimensions, and propeller or engine revolutions per minute.

11. The sensor device according to claim 10, wherein the at least one processor is configured to automatically calibrate an inclinometer by mathematically turning the inclinometer to right position based on the speed over ground, time, pitch and roll information.

12. The sensor device according to claim 10, wherein the at least one processor is configured to determine an optimized trim value based on the trim, the draft and the speed over ground information.

13. The sensor device according to claim 10, wherein the at least one processor is configured to determine an optimized speed over ground value based on the speed over ground, draft and the propeller or engine revolutions per minute.

14. The sensor device according to claim 10, wherein the at least one processor is configured to determine an amount of propeller slip based on the speed over ground and the propeller or engine revolutions per minute.

15. A method for providing marine vessel data of a marine vessel with a sensor device, the method comprising:
receiving, with a receiver, an identification signal including at least position and time information relating to the marine vessel;
measuring, with at least one sensor of the sensor device, marine vessel performance data based on a response of a hull structure of the marine vessel during operation of the marine vessel when the sensor device is affixed to the hull structure of the marine vessel;
performing, with at least one processor, frequency analysis of the measured marine vessel performance data; and
generating, with the at least one processor, marine vessel data based on the received at least position and time information and the frequency analyzed marine vessel performance data,
wherein the sensor device including the receiver, the at least one sensor, the at least one processor, and a data interface is configured to provide at least the marine vessel data to an external device over the data interface without integration to the marine vessel's information systems.

16. The method according to claim 15, wherein the receiving comprises receiving automatic identification system data sent by the marine vessel, the automatic identification system data comprising the position and time information, and generating the marine vessel data based on the received automatic identification system data and the frequency analyzed marine vessel performance data.

17. The method according to claim 15, comprising:
storing the generated marine vessel data in at least one memory of the sensor device.

18. The method according to claim 15, comprising:
causing transmission of the generated marine vessel data to an external device via a data interface.

19. The method according to claim 15, wherein the at least one sensor for measuring marine vessel performance data comprises an acceleration sensor operable to measure vibrations of the hull structure and/or motions of the marine vessel.

20. The method according to claim 15, wherein the at least one sensor for measuring marine vessel performance data comprises at least one gyroscope operable to measure motions of the marine vessel.

21. The method according to claim 15, wherein the at least one sensor for measuring marine vessel performance data comprises at least one inclinometer operable to measure inclination of the marine vessel.

22. The method according to claim 19, comprising analyzing the signals measured by at least one of an accelerometer, inclinometer or gyroscope to identify a fundamental frequency in the signals in order to determine speed of rotation of a propeller of the marine vessel or of the main engine.

23. The method according to claim 19, comprising analyzing the signals measured by at least one of an accelerometer, gyroscope or inclinometer to identify main components of the frequency spectrum of the signals by applying a dimensionality reduction method.

24. The method according to claim 15, wherein the marine vessel data comprises at least one marine vessel parameter selected from: time, position, speed over ground, course over ground, true heading, rate of turn, estimated time of arrival, draft, trim, list, pitching, surging, rolling, swaying, yawing, heaving, vibrations in three dimensions, and propeller or engine revolutions per minute.

25. The method according to claim 24, comprising determining an optimized the speed over ground value based on the speed over ground, draft and the propeller or engine revolutions per minute.

26. The method according to claim 24, comprising determining an amount of propeller slip based on the speed over ground and the propeller or engine revolutions per minute.

27. The method according to claim 24, comprising automatically calibrating the inclinometer by mathematically turning an inclinometer to a right position based on the speed over ground, time, pitch and roll information.

28. The method according to claim 24, comprising determining an optimized trim value based on the trim, draft and speed over ground information.

29. A computer readable medium having a computer program stored thereon, the computer program comprising program code instructions for providing marine vessel data for a marine vessel, which when the computer readable medium is placed in communicable contact with a processing unit the computer program is executed by the processing unit to perform the following:

causing receipt of an identification signal including at least position and time information relating to the marine vessel;

causing measurement, with at least one sensor of a sensor device, of marine vessel performance data based on a response of a hull structure during operation of the marine vessel when the sensor device is affixed to the hull structure of the marine vessel;

performing frequency analysis of the measured marine vessel performance data;

generating marine vessel data based on the received at least position and time information and the frequency analyzed marine vessel performance data; and sending at least the generated marine vessel data to an external device over a data interface of the sensor device.

30. A sensor device according to claim 1 in combination with a marine vessel, the marine vessel comprising:

a hull structure, wherein the sensor device is attached to the hull structure of the marine vessel.

\* \* \* \* \*